US008964119B2

(12) United States Patent
Sagliocco et al.

(10) Patent No.: US 8,964,119 B2
(45) Date of Patent: Feb. 24, 2015

(54) METHODS AND APPARATUSES FOR TRANSMITTING AND FOR RECEIVING MULTIMEDIA CONTENTS

(75) Inventors: Sergio Sagliocco, Turin (IT); Leonardo Sileo, Turin (IT); Roberto Borri, Nole (IT)

(73) Assignees: CSP-Innovazione Nelle ICT Scarl, Turin (IT); S.I.SV.EL Societa' Italiana per lo Sviluppo Dell'Elettronica S.p.A. (IT)

( * ) Notice: Subject to any disclaimer, the term of this patent is extended or adjusted under 35 U.S.C. 154(b) by 0 days.

(21) Appl. No.: 14/236,400

(22) PCT Filed: Aug. 2, 2012

(86) PCT No.: PCT/IB2012/053967
§ 371 (c)(1),
(2), (4) Date: Jan. 31, 2014

(87) PCT Pub. No.: WO2013/018058
PCT Pub. Date: Feb. 7, 2013

(65) Prior Publication Data
US 2014/0168515 A1    Jun. 19, 2014

(30) Foreign Application Priority Data
Aug. 3, 2011   (IT) .............................. TO2011A0723

(51) Int. Cl.
*H04N 9/475* (2006.01)
*H04N 5/067* (2006.01)
(Continued)

(52) U.S. Cl.
CPC ............ *H04N 5/0675* (2013.01); *G06T 1/0071* (2013.01); *H04N 21/4307* (2013.01);
(Continued)

(58) Field of Classification Search
CPC .................. H04N 21/8358; H04N 21/23614; H04N 21/235; H04N 21/44218; H04N 21/44245; H04N 21/4622; H04N 21/47202; H04N 5/4403; H04N 1/32144; H04N 1/32208; H04N 1/3232; H04N 1/32; H04N 2201/3278; H04N 9/8063
USPC ......... 348/515, 512, 518–519, 473, 476, 478, 348/192, 180, 513, 42
IPC ....................................................... H04N 9/475
See application file for complete search history.

(56) References Cited

U.S. PATENT DOCUMENTS 6,373,960 B1 * 4/2002 Conover et al. ............... 382/100
6,480,902 B1 * 11/2002 Yuang et al. .................. 709/248
(Continued)

OTHER PUBLICATIONS

Kinji Matsumura et al., *Personalization of Broadcast Programs Using Synchronized Internet Content*, Consumer Electronics, 2010 Digest of Technical Papers International Conference on, IEEE, Piscataway, Jan. 9, 2010, pp. 145-146, XP031640972.

(Continued)

*Primary Examiner* — Trang U Tran
(74) *Attorney, Agent, or Firm* — Workman Nydegger

(57) ABSTRACT

Methods and apparatuses are provided for transmitting and receiving multimedia contents that include at least two components (C1, C2). The reception method entails the reception of a first component (C1) from a first transmission medium (DVB) and the reception of a second component (C2) from a second transmission medium (IP), as well as the steps of: detecting (A4) a first "watermark" sequence from the first component (C1), detecting (A4) a second "watermark" sequence from the second component (C2), synchronizing (A5) the first and second components (C1, C2) on the basis of the first and second "watermark" sequences, and combining (A6) the synchronized first and second components (C1, C2) to form the multimedia content (MM); of course, the reception method provides the desired results if both components have been suitably and repeatedly marked prior to transmission.

15 Claims, 4 Drawing Sheets

Figure 1:
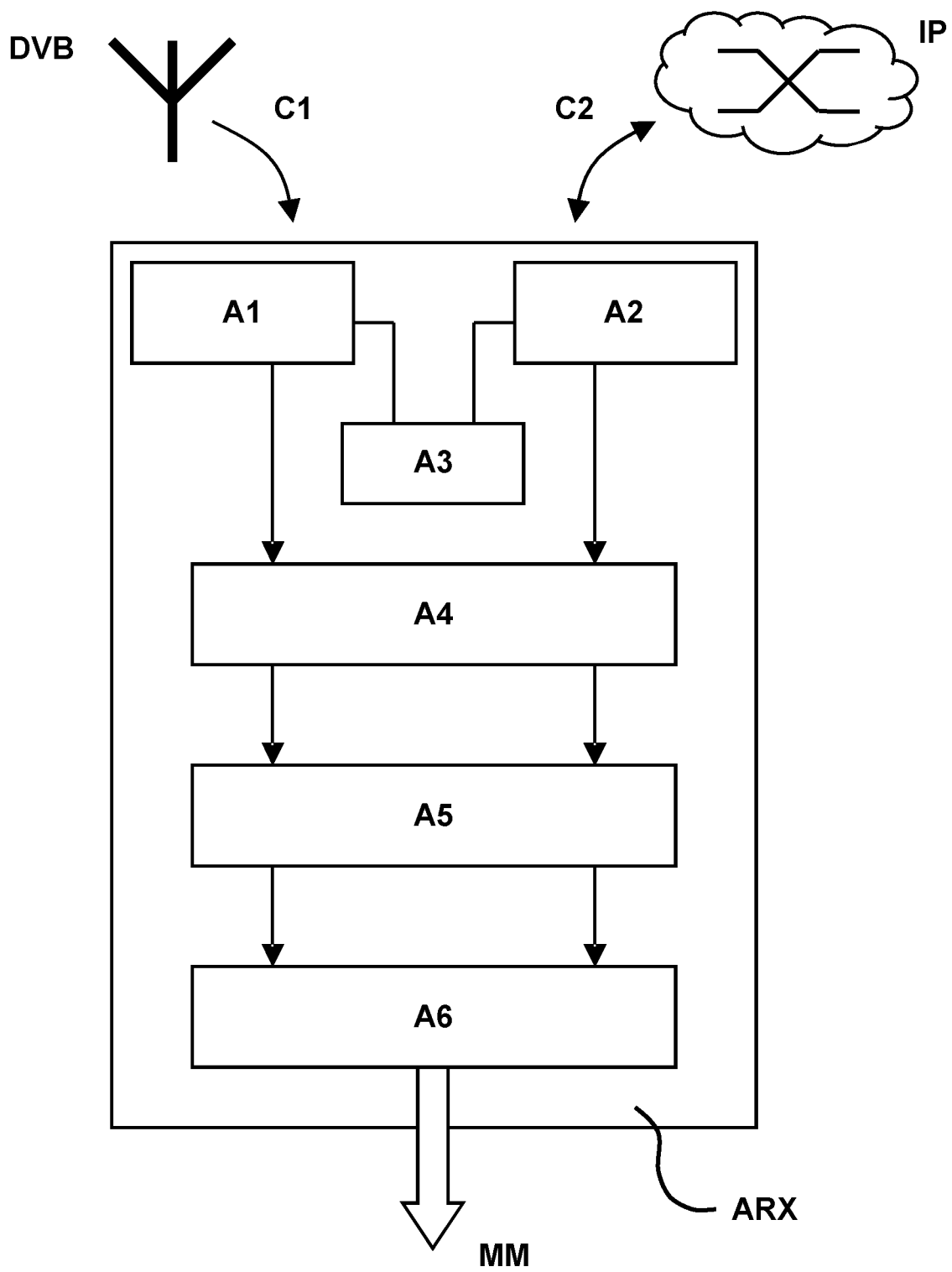

(51) Int. Cl.
    *G06T 1/00*     (2006.01)
    *H04N 21/43*     (2011.01)
    *H04N 21/44*     (2011.01)
    *H04N 21/462*     (2011.01)
    *H04N 21/61*     (2011.01)
    *H04N 21/81*     (2011.01)
    *H04N 21/8358*     (2011.01)

(52) U.S. Cl.
    CPC ..... *H04N21/44008* (2013.01); *H04N 21/4622* (2013.01); *H04N 21/6125* (2013.01); *H04N 21/816* (2013.01); *H04N 21/8358* (2013.01); *G06T 1/0021* (2013.01)
    USPC .............................. 348/518; 348/512; 348/42

(56) References Cited

U.S. PATENT DOCUMENTS

| | | | | |
|---|---|---|---|---|
| 6,836,295 B1 * | 12/2004 | Cooper | ........................ | 348/515 |
| 8,677,437 B2 * | 3/2014 | Wei | ................................ | 725/118 |
| 2013/0177199 A1 * | 7/2013 | Subramanian et al. | ........ | 382/100 |

OTHER PUBLICATIONS

Regunathan Radhakrishnan et al., *Audio and Video Signatures for Synchronization*, Multimedia and Expo, 2008 IEEE International Conference on, IEEE, Piscataway, Jun. 23, 2008, pp. 1549-1552, XP031313030.

DVB Organization, *CM-3DTV0061 Network Operators Commercial Requirements for Phase 2 3DTV*, DVB, Digital Video Broadcasting, Nov. 24, 2010, pp. 3, XP017830934.

International Search Report dated Oct. 16, 2012, issued in PCT Application No. PCT/IB2012/053967, filed Aug. 2, 2012.

International Preliminary Report on Patentability and Written Opinion dated Feb. 4, 2014, issued in PCT Application No. PCT/IB2012/053967, filed Aug. 2, 2012.

\* cited by examiner

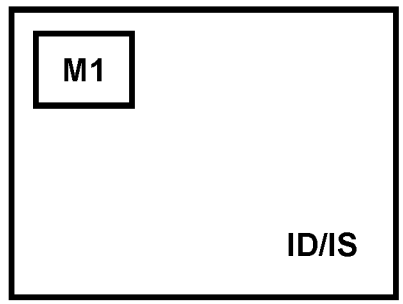
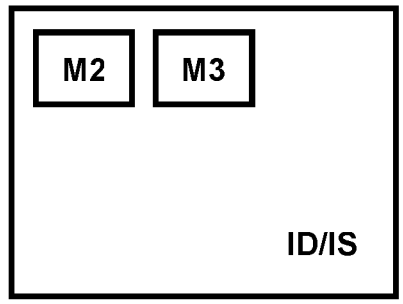
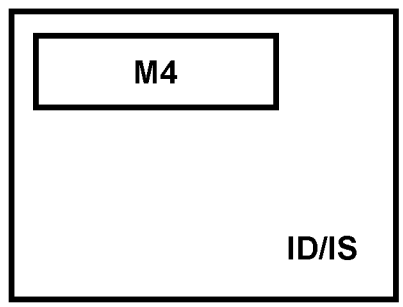

METHODS AND APPARATUSES FOR TRANSMITTING AND FOR RECEIVING MULTIMEDIA CONTENTS

FIELD OF THE INVENTION

The present invention relates to methods and apparatuses for transmitting and receiving multimedia contents.

BACKGROUND ART

Fruition of multimedia contents is a need which has recently become increasingly felt by the users, and will tend to increase even further in the future.

For example, many years ago a television signal included two components: an audio component and a video component. The teletext component was then added. More recently, especially for television programs which are broadcast via satellite, a plurality of audio components, each corresponding to a different language, have been included. Stereoscopic (or "3D) television programs are now beginning to gain ground; in simple words, in order to improve the three-dimensional effect perceived by the viewer, slightly different sequences of images are provided for the right eye and for the left eye.

Multimedia contents are generally produced for transmission through electric and/or optic signals; if the multimedia content changes, e.g. because new components are added, the transmitted signal will change as well; therefore, receiving such modified signals will require changes to the receivers owned by the users, if such changes are feasible, or else the users will need to purchase new receivers.

It must also be considered that, since many users are often not interested in viewing "improved" multimedia contents, it is important to ensure that such users can continue to view "non-improved" multimedia contents; for example, those users who are not interested in "3D television" must still be allowed to watch "2D television".

In this regard, the DIOMEDES project financed by the European Union has proposed and studied the possibility of broadcasting a "3D content" through two "delivery channels", i.e. a first channel using DVB technology (for the "basic content" that can be viewed by everybody) and a second channel using IP technology (for the "additional content").

This project, however, has not specifically tackled the following aspects:
  synchronization of the signals transmitted over the two "delivery channels",
  signaling for the signals transmitted over the two "delivery channels";

and has generically stated that telecommunication standards already included mechanisms which may be used for such purposes.

As far as synchronization is concerned, the DIOMEDES project has proposed to use the video PID's [Packet Identifiers] of each view, the audio PID's of each track, and the PID of the PCR [Program Clock Reference], and to generate the PTS's [Presentation Time Stamps] and the DTS's [Decoding Time Stamps] by starting from the same clock; such information has not however been conceived for establishing a synchronization between different information streams, and therefore it does not ensure any accuracy at all; moreover, since the information streams follow different and unpredictable paths (especially as concerns the Internet-transported stream), it may happen that one or both of them undergo multiplexing and/or re-coding operations and thus lose track of the common time reference originally given by the fact that they were two "elementary streams" of the same "transport stream".

As far as signaling is concerned, the DIOMEDES project has proposed to use the signaling mechanisms described in the ETSI TS 102 809 V1.1.1 standard; this means that the "basic content" or "primary stream" must necessarily be transported with DVB technology, because this standard and the signaling thereof specifically refer to that technology.

SUMMARY

It is the general object of the present invention to overcome the prior art.

This and other objects are achieved through methods and apparatuses for transmitting and receiving multimedia contents having the technical features set out in the appended claims, which are intended to be an integral part of the present invention.

The idea at the basis of the present invention is to use "watermarking" at least for synchronization purposes, and preferably also for signaling purposes.

"Watermarking" is a known technique commonly used in the electronics industry in order to protect multimedia contents from unauthorized copying and/or to ensure multimedia content authenticity. In these applications, a mark (e.g. a logo) is superimposed on a content (e.g. an image or a sequence of images, i.e. a video); the mark has no real information content or, more precisely, it has value simply because it is present and recognizable when compared with a "reference mark"; for each content (image, video), a different mark can be used, but frequently the author or holder of a plurality of contents uses the same mark for all contents. Such a technique has been described in depth, for example, in the book "Techniques and Applications of Digital Watermarking and Content Protection" by Michael Arnold, Martin Schmucker, Stephen D. Wolthusen, published by Artech House in July 2003.

Instead, the present invention uses the "watermark" to add or, more precisely, to superimpose, additional information to/on the multimedia content; moreover, a plurality of different marks are required for every single multimedia content.

In general, the goal is to transmit a multimedia content comprising at least two components over at least two corresponding transmission media.

According to a typical (but non-limiting) application of the present invention, said media may be a television channel using DVB-T technology and an Internet connection using IP technology; alternatively, for example, the two media may be two television channels or two Internet connections.

According to a typical (but non-limiting) application of the present invention, a first one of the two components is a traditional television signal (which in turn, therefore, comprises three sub-components: 2D video, audio and teletext) and a second one of the two components is a 2D video signal; the two 2D video components make up, as a whole, a 3D video.

The first component is transmitted over the first medium, whereas the second component is transmitted over the second medium.

Since two transmission media are used, the receiver will not, in general, receive both components at synchronized times, even if they were transmitted in a perfectly synchronized manner.

In order to allow the receiver to re-synchronize the two received components, the transmission system will have to:

A) repeatedly mark, through a first predetermined "watermark" sequence, the first component prior to its transmission, and B) repeatedly mark, through a second predetermined "watermark" sequence, the second component prior to its transmission;

the first "watermark" sequence has a correspondence with the second "watermark" sequence (in the simplest and most typical case of a stereoscopic video, the two sequences are identical); steps A and B are, in fact, so conceived that the insertion of "watermarks" into the first component and the insertion of "watermarks" into the second component take place at corresponding points or instants of the first and second components.

Because the synchronization information remain embedded in the components themselves whatever happens to the two components along the path from the initial transmitter to the final receiver, re-synchronization by the final receiver is always possible; therefore, no particular constraints are imposed on the transmission media. Only noise and disturbances might jeopardize the possibility of re-synchronizing the received components, but these elements directly affect also the quality of the content of the received components.

In order to receive a multimedia content which comprises at least two components and which has been transmitted as stated above, the receiver receives a first component of said at least two components from a first transmission medium and a second component of said at least two components from a second transmission medium; in addition, it does the following:

A) it detects a first "watermark" sequence from said first component,

B) it detects a second "watermark" sequence from said second component,

C) it synchronizes said first and second components on the basis of said first and second "watermark" sequences, and D) it combines said synchronized first and second components to form said multimedia content.

LIST OF DRAWINGS

Figure 2:
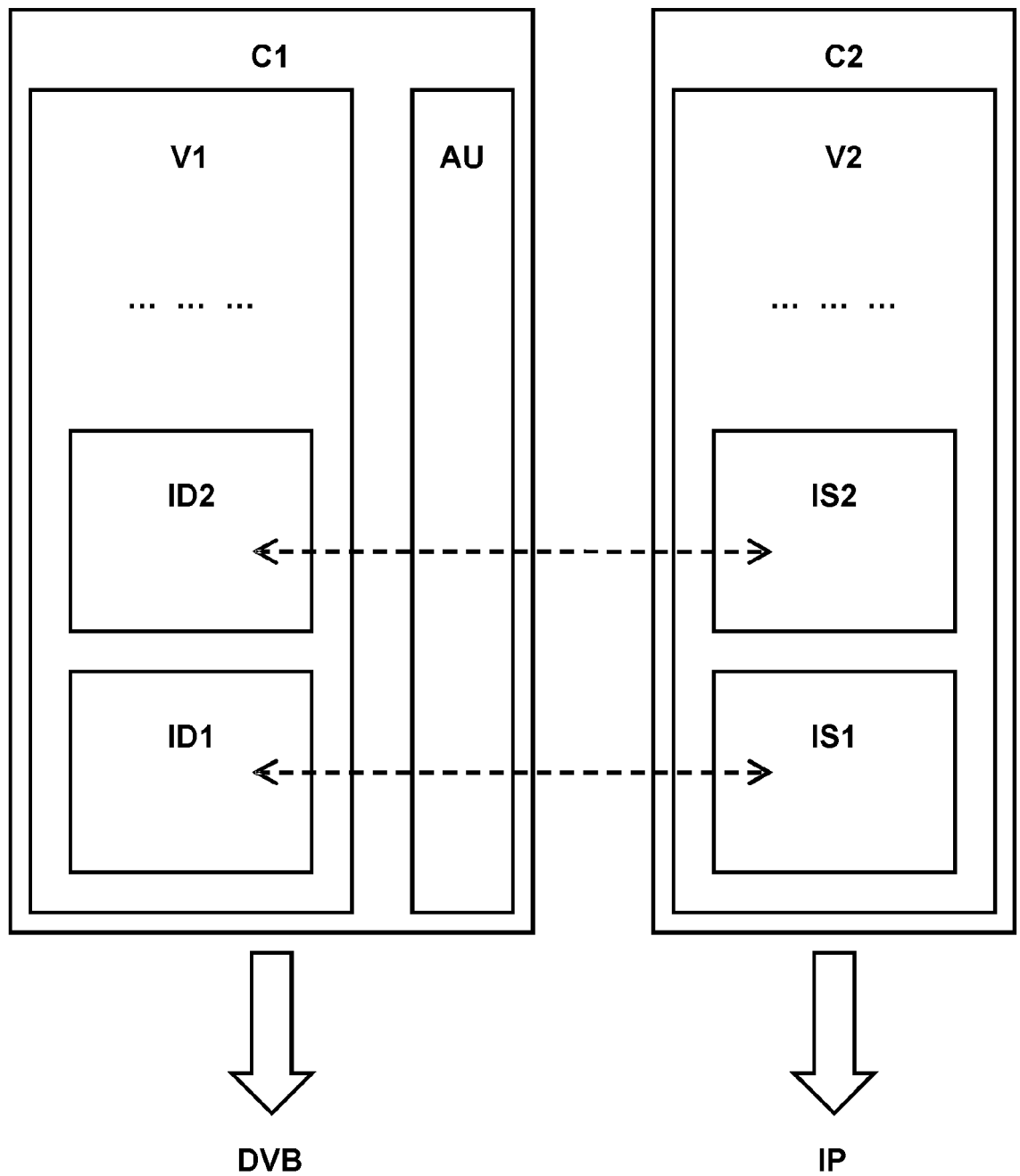
Figure 3:
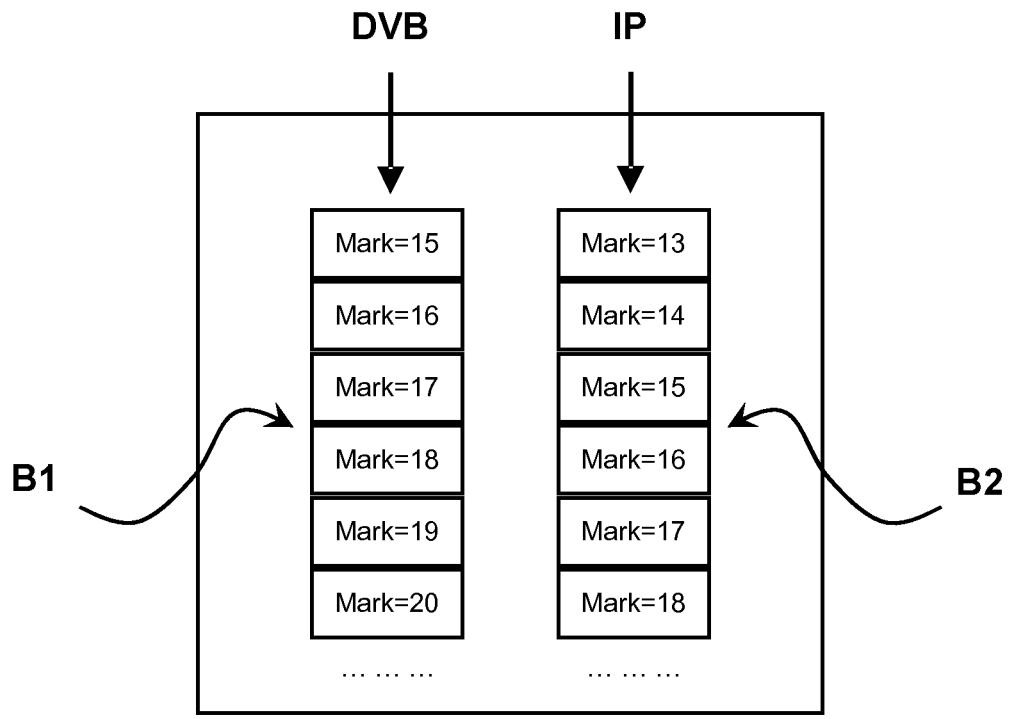
Figure 4:
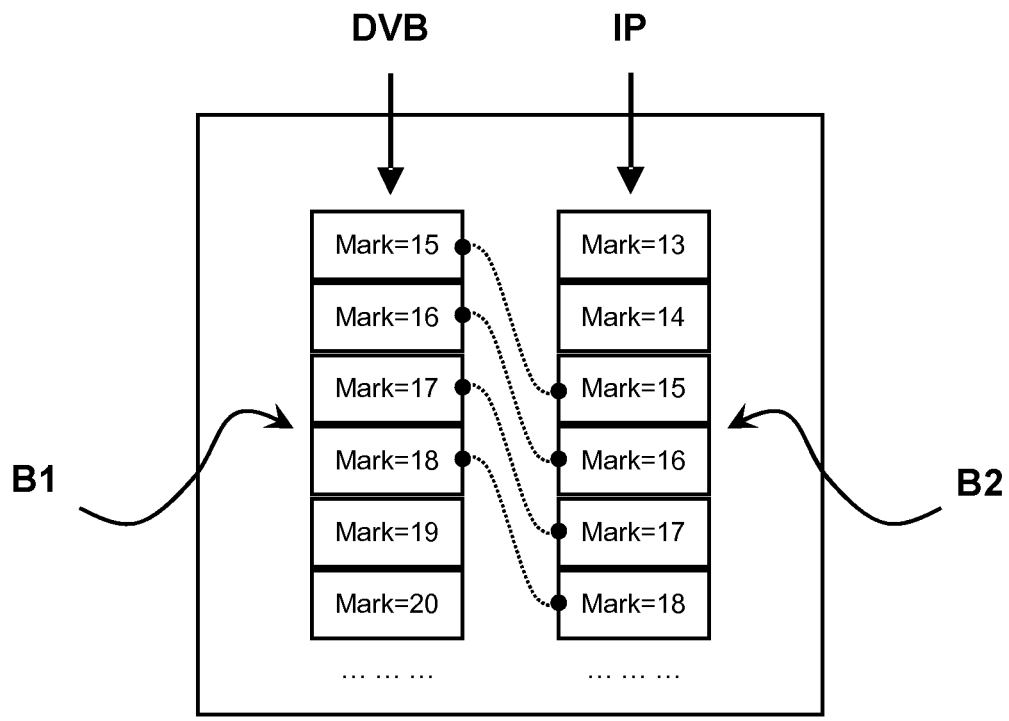

The technical features and the advantages of the present invention will become more apparent from the following description referring to the annexed drawings, wherein:

FIG. 1 shows a block diagram of an example of embodiment of a reception apparatus according to the present invention, FIG. 2 shows a first diagram useful for understanding the transmission method according to the present invention, FIG. 3 shows a first diagram useful for understanding the reception method according to the present invention, wherein two components of a multimedia content are not synchronized, FIG. 4 shows a second diagram useful for understanding the reception method according to the present invention, wherein two components of a multimedia content have been re-synchronized, FIG. 5 shows a first possible information structure to be coded by "watermarking" according to the present invention, FIG. 6 shows a possible embodiment of "watermarking" based on the information structure of FIG. 5 (images not in scale), FIG. 7 shows a second possible information structure to be coded by "watermarking" according to the present invention, FIG. 8 shows a possible embodiment of "watermarking" based on the information structure of FIG. 7 (images not in scale), FIG. 9 shows a third possible information structure to be coded by "watermarking" according to the present invention, and FIG. 10 shows a possible embodiment of "watermarking" based on the information structure of FIG. 9 (images not in scale).

DETAILED DESCRIPTION

Both this description and said drawings are to be considered merely for explanatory, and hence non-limiting, purposes; the present invention may therefore be implemented in accordance with other and different embodiments thereof.

The simple cases that will be taken into account below will facilitate the understanding of the present invention.

Referring now to FIG. 2, it is assumed that there is a multimedia content corresponding to a 3D video with the associated audio; the 3D video includes a first 2D video (referred to as V1 in FIG. 2) with the sequence of images for the right eye (referred to as ID1, ID2, . . . in FIG. 2) and a second 2D video with the sequence of images for the left eye (referred to as IS1, IS2, . . . in FIG. 2). The two 2D videos (referred to as V1 and V2 in FIG. 2) and the audio (referred to as AU in FIG. 2) are synchronized with one another; in particular, as concerns the two 2D videos, one image of the first 2D video corresponds to one image of the second 2D video (and vice versa), so as to create a three-dimensional effect; in FIG. 2, a first arrow represents the correspondence of one image ID1 of the video V1 with an image IS1 of the video V2, and a second arrow represents the correspondence of one image ID2 of the video V1 with one image IS2 of the video V2.

It is also assumed that the first 2D video V1 and the audio AU, which together constitute a first component C1 of a multimedia signal, are transmitted through a traditional television signal, in particular by using the DVB-T technology (as schematically shown in FIG. 2 by the arrow designated as DVB), and that the second 2D video, which constitutes a second component C2 of the multimedia signal, is transmitted over the Internet (as schematically shown in FIG. 2 by the arrow designated as IP). In this case, the television signal will be broadcast through one or, more typically, a plurality of radio transmitters connected to antennas, while the second 2D video will be made available through the Internet thanks to, for example, a server connected to the Internet.

The present invention is also applicable to cases which are more complex than the one just described, e.g. when the multimedia content is subdivided into three or more components and/or when three or more transmission media are used and/or when each component includes a plurality of sub-components (e.g. each component may include a video signal and an audio signal).

Upstream of the radio transmitters that broadcast the television signal containing the video V1 and the audio AU and of the server that makes available the video V2, it is necessary to provide a device which receives the multimedia content, subdivides it into the two components C1 and C2, and forwards the latter to the transmitters and to the server, respectively; the set consisting of said device, the transmitters and the server (plus any other possible components) can be considered to be a large apparatus or a system for transmitting multimedia contents.

The television signal, as defined by telecommunication standards, keeps the video and the audio synchronized, in particular the video V1 and the audio AU, and transports them simultaneously towards the user terminal.

However, in order to let the user terminal re-synchronize the videos V1 and V2 after receiving them, so that it can reproduce the desired three-dimensional effect, it is necessary to implement a particular transmission method.

According to the present invention, the first component C1 of the multimedia content, in particular the images of the video V1, are marked with a first predetermined "watermarking" sequence, and the second component C2 of the multimedia content, in particular the images of the video V2, are marked with a second predetermined "watermarking" sequence; the components C1 and C2 are then transmitted over the chosen transmission media.

In the case of FIG. 2, since images are marked in both the first component and the second component, the two "watermarking" sequences may even, for simplicity, be identical (or correspond to each other, in particular with an exact correspondence).

The marks of the "watermarking" sequences must allow for a univocal association between images of the two videos; one such possibility of association is given by the information coded through the marks themselves.

A simple and effective solution is to use numbers, e.g. having two digits, three digits, four digits or more digits; the number of digits may advantageously be chosen by taking into account the longest possible reception delay between the two components (if on average one image is transmitted every 20 ms, by using two digits it will be possible to compensate 2 seconds of delay at most between the two components).

According to a first example, if the image ID1 (see FIG. 2) is marked with a mark corresponding to the number "44", then also the corresponding image IS1 (see FIG. 2) may be marked with a mark corresponding to the number "44", and, if the next image ID2 (see FIG. 2) is marked with a mark corresponding to the number "17", then also the corresponding image IS2 (see FIG. 2) may be marked with a mark corresponding to the number "17"; it can be understood that, since the marks are not necessarily used for re-sorting or verifying the correct and complete reception of the video, the order of the numbers is unimportant, but must be predetermined in a manner such that the same number is not associated with two temporally close images; it must be pointed out that, as far as the video transmitted over the Internet is concerned, it may happen that the order of reception of the images does not correspond to the order of transmission, so that the "watermarks" may also help re-sorting the images, especially for those transmission media that cannot ensure that the sequence is maintained (it should be remembered that the RTP and TCP network protocols already include data packet re-sorting mechanisms).

According to a second example, if the image ID1 (see FIG. 2) is marked with a mark corresponding to the number "1044", the corresponding image IS1 (see FIG. 2) may be marked with a mark corresponding to the number "2044", and, if the next image ID2 (see FIG. 2) is marked with a mark corresponding to the number "1017", the corresponding image IS2 (see FIG. 2) may be marked with a mark corresponding to the number "2017"; in this case the numbers are different, but nonetheless they show correspondence, i.e. the first digit indicates the progressive number of the video ("1" for the video V1 and "2" for the video V2) and the remaining three digits are used for synchronization purposes.

According to other examples, alphanumeric strings may be used as "watermarks". Said digits or alphanumeric strings may also be represented in binary form or in any other associated representation form considered to be valid according to the information theory, provided that it is also known on the reception side so as to ensure the recognition of the watermarking data embedded by the transmitter and extracted by the receiver in accordance with the watermarking technique currently used by the transmission system, with which they are both compatible.

For synchronization purposes, one can avoid marking all images, as it is done in the two examples just described; for example, one may mark one image and then not mark the next image, or one may mark one image and then not mark the next two images; of course, to ensure good synchronization it is advisable that marks are inserted quite frequently.

It will now be considered what may take place at reception within an apparatus for receiving multimedia content, in particular an apparatus for receiving "3D television".

FIG. 3 schematically shows a situation of images received by such a receiver from a television antenna (arrow DVB) and from the Internet (arrow IP); it is assumed herein that the receiver has a first buffer B1 for a first component received from a first transmission medium and a second buffer B2 for a second component received from a second transmission medium; in the buffer B1 there are six right images, respectively marked with marks corresponding to the numbers "15", "16", "17", "18", "19" and "20"; in the buffer B2 there are six left images, respectively marked with marks corresponding to the numbers "13", "14", "15", "16", "17" and "18"; FIG. 3 also shows the fact that the right image marked with "15" has been received simultaneously with the left image marked with "13", the right image marked with "16" has been received simultaneously with the left image marked with "14", the right image marked with "17" has been received simultaneously with the left image marked with "15", the right image marked with "18" has been received simultaneously with the left image marked with "16", the right image marked with "19" has been received simultaneously with the left image marked with "17", the right image marked with "20" has been received simultaneously with the left image marked with "18" (in this case progressive numbers have been used but, as aforementioned, this is not strictly necessary, even though it is advantageous for the present invention).

The receiver according to the present invention detects the "watermarks" on both components, decodes such marks, thereby obtaining the above-mentioned numbers (or, more in general, information), and, on the basis of such numbers, it can re-synchronize the two components.

FIG. 4 shows some images of the two re-synchronized components; it is worth pointing out that the synchronization process does not necessarily require moving data within the memory of the receiver, but it may suffice to use pointers and store into said pointers information allowing the buffers to be properly read at the reproduction stage, exactly as indicated in FIG. 4.

Up to this point it has been assumed that the apparatus for transmitting multimedia contents (according to the present invention) and the apparatus for receiving multimedia contents (according to the present invention) know how the multimedia content has been subdivided into components (e.g. a first component containing one audio and one video and a second component containing only one video), which transmission media are involved (e.g. the digital terrestrial television infrastructure and the Internet), and which parameters are involved, i.e. must be transmitted and received (e.g. radio frequency and Internet address).

According to a first option, such operating information (or a part thereof) is set beforehand in one or both of the apparatuses. As regards the subdivision of the multimedia content and the identification of the transmission media, this first option may be reasonable as well, in that these two elements have a more or less direct impact on the hardware.

According to a second, more flexible, option, such operating information (or a part thereof) is set in one or both of the apparatuses by the respective users; this second option is typical of the transmission apparatus (or system), but it is uncomfortable for the reception apparatus, because it forces the user thereof, who is typically a common person, to deal with information that requires technical skill.

According to a third option, which may be used for the reception apparatus only (according to the present invention), such operating information (or a part thereof) is obtained by the apparatus directly from the signals being received; as can be easily understood, this third option is particularly advantageous.

Such signaling may advantageously be provided through "watermarking", i.e by marking one, some or all components of the multimedia content to be transmitted with marks adapted to code, and hence signal to the receiver, operating information that allows to identify, receive and treat the components of the multimedia content and therefore to reconstruct the multimedia content.

In particular, in the simple case of a multimedia content subdivided into two components, the first component will signal operating information pertaining to the second component and/or the second component will signal operating information pertaining to the first component. Theoretically, one, some or all components can "transport" a great deal of signaling information; however, if there is too much information, the "marking" may excessively degrade the quality of the multimedia content.

The pieces of information to be signaled may be one, some or all of the following:
TI: type of information contained in a component (in particular, a component may contain signaling information not pertaining to that component, but to the other component)
SO: source or transmission medium from which a component comes (in particular the other component)
PR: priority of a component (in particular the other component)
PA: various parameters associated with a component (in particular the other component)

The information TI may comprise, for example, the following values (which are typically appropriately coded into binary information):
"right view"
"left view"
"audio in the main language"
"audio in a secondary language"
"subtitles"
"right view"+"audio in the main language"
"left view"+"audio in a secondary language"
...

The information SO may comprise, for example, the following values (which are typically appropriately coded into binary information):
"rtp://IP:PORT" which means:
RTP stream on IP from address IP and port PORT
"udp://IP:PORT" which means:
UDP stream on IP from address IP and port PORT
"dvb-t://FREQ,PID" which means:
DVB-T stream at frequency FREQ and pid PID
"dvb-s://SOURCE,FREQ,SRATE,POL,PID" which means:
DVB-S from satellite SOURCE, at frequency FREQ, symbol rate SRATE, polarization POL and pid PID "dvb-t2://FREQ,PID" which means:
DVB-T2 stream at frequency FREQ and pid PID
"dvb-s2://SOURCE,FREQ,SRATE,POL,PID" which means:
DVB-S2 stream from satellite SOURCE, at frequency FREQ, symbol rate SRATE, polarization POL and pid PID
...

The information PR (which is typically appropriately coded into binary information) may be useful when a multimedia content has been subdivided into three or more components transmitted over different transmission media and one wants to signal to the receiver where sub-components should preferably be retrieved. For example, if the right view is transmitted through a DVB-T stream and the left view is transmitted through both a DVB-S stream and an RTP stream, it may be useful to signal to the receiver that for receiving the left view it is preferable to use the DVB-S stream; typically, if the receiver is adapted to receive the DVB-S stream (i.e. to receive satellite signals), then it will follow the priority signaled by the transmitter, otherwise it will receive the left view from the RTP stream or will not receive it at all (e.g. if it is not equipped with an Internet interface or the Internet connection is not active). As a further example, if the right view is transmitted through a DVB-T stream and the left view is transmitted through both an RTP stream from the address IP1 and an RTP stream from the address IP2, it may be useful to signal to the receiver that for receiving the left view it is preferable to use the RTP stream from the address IP1 because it corresponds to a more powerful server or because the server is closer to the user.

The information PA may be useful for many other purposes; for example, if the information TI signals "audio in the main language" or "audio in a secondary language", the information PA may signal which language it is ("IT" for Italian, "FR" for French, "GB" for British English, and so on), or if reception of the other associated component is a pay service.

"Watermarking" for signaling purposes is done repeatedly on one, both or all components, and typically in a periodical or quasi-periodical manner. It must be pointed out that the information carried by this marking remains constant or changes very seldom; therefore, the corresponding "watermarking" sequence may consist of the same mark which is repeated for a very long time, e.g. weeks, months or even years.

As far as the type of information being "transported" is concerned, the signaling "watermarking" frequency may advantageously be much lower than the synchronization "watermarking" frequency; for example, it is conceivable to adopt a frequency comprised between once per second and once per minute; such a choice is advantageous because the quality of the multimedia content will not be excessively and uselessly degraded and because the receiver will not have to carry out a complex and fast processing of the received components of the multimedia content.

It can be understood from the above that the present invention provides for applying a synchronization marking through a "watermarking" sequence and, possibly and advantageously, also a signaling marking through a "watermarking" sequence.

For these operations, one may use a single "watermarking" sequence for synchronization only, or a "watermarking" sequence for synchronization and a distinct "watermarking" sequence for signaling, or a single "watermarking" sequence for both synchronization and signaling; FIG. 5 and FIG. 6 refer to the first case; FIG. 7 and FIG. 8 refer to the second case; FIG. 9 and FIG. 10 refer to the third case.

It is worth pointing out that, in the case of FIG. 6 and FIG. 8 and FIG. 10, the watermarks are graphic symbols superimposed on the images in a visible manner in order to facilitate the understanding of the examples of FIG. 5 and FIG. 7 and FIG. 9, but, preferably, the marks are invisible or almost invisible. Also, the positions indicated in FIG. 6 and FIG. 8 and FIG. 10 should not be considered to be restrictive for the present invention; when invisible or almost invisible marks are used, the marks are typically distributed over the whole image, and are not therefore associated with any particular position.

In FIG. 5, the structure of the information to be coded through "watermarking" simply consists of a data field SI (e.g. a string of numeric, alphabetic or alphanumeric characters); such a structure can originate, for example, marks M1 superimposed on the images ID/IS of a video at the upper left angle thereof, as schematically shown in FIG. 6.

In FIG. 7, the structure of the information to be coded through "watermarking" consists of two elements; the first element includes just one data field SI (e.g. a string of numeric, alphabetic or alphanumeric characters) and the second element includes a set of data fields TI, SO, PR, PA (e.g. a string of numeric, alphabetic or alphanumeric characters); such a structure can originate, for example, marks M2 for the first element and marks M3 for the second element; both the marks M2 and the marks M3 are superimposed on the images ID/IS of a video at the upper left angle thereof and are arranged side by side, as schematically shown in FIG. 8. It should be remembered that, since the two markings have different time requirements, it is possible that both marks M2 and M3 are superimposed only on a few video images, and only the marks M2 are superimposed on most video images. In this case, advantageously, the marks M2 and M3 are made in the same manner, so that they can be detected and decoded in the receiver by means of the same hardware and/or software means.

In FIG. 9, the structure of the information to be coded through "watermarking" consists of just one element including a set of data fields SI, TI, SO, PR, PA (e.g. a string of numeric, alphabetic or alphanumeric characters); such a structure can originate, for example, marks M4 superimposed on the images ID/IS of a video at the upper left angle thereof, as schematically shown in FIG. 10.

In the case of FIG. 6 and FIG. 8 and FIG. 10, the watermarks are graphic symbols which are superimposed on the images in a visible manner; preferably, however, the marks are invisible or almost invisible.

It must nevertheless be pointed out that, as known to those skilled in the art, the "watermarking" techniques are not limited to this kind of physical and visual superimposition, and that the present invention has no limitations in this respect.

Some types of digital signals may contain additional information/data, such as, for example, "metadata"; "watermarking" is very different, because the information/data are carried directly by the signal or, in other words, they are superimposed on the signal.

The "watermarking" techniques, in particular the "digital watermarking" techniques, differ from one another for a few characteristic parameters: robustness, visibility, capacity, insertion method.

As far as robustness is concerned, the marking may be fragile, semi-fragile or robust. To implement the present invention, it is preferable that the marking is fragile or semi-fragile because more information is transported with the same superimposition; besides, since the marking of the present invention does not aim at protecting the multimedia content from misuse, robustness is not necessary.

As far as visibility is concerned, the marking may be either visible or invisible. To implement the present invention, it is preferable that the marking is invisible or almost invisible, so that it cannot be perceived by the user as an element disturbing the multimedia content.

As far as capacity (quantity of information coded by a mark) is concerned, the marking may be "zero-bit long" or "1-bit watermark" or "n-bit watermark" or "multi-bit watermark". To implement the present invention, it is necessary that the marking is of the "n-bit watermark" or "multi-bit watermark" type, in that the marks must code information which is at least sufficient to ensure the re-synchronization of the multimedia components.

As far as the insertion method is concerned, the marking may essentially be either "in the time domain" or "in the frequency domain". To implement the present invention, it is preferable that the marking is in "the frequency domain", because this type of insertion promotes mark invisibility: in practice, the superimposition should be located where the image is more "blurred" (in space and/or time), so that it is less visible.

FIG. 1 shows, in a very schematic way, an example of embodiment of a receiving apparatus ARX according to the present invention.

The apparatus ARX is adapted to receive signals over the air DVB and from the Internet IP; for the air, the DVB symbol has been used because the apparatus detects electric signals according to at least one of the DVB standards (in particular, DBV-T and/or DVB-S), which propagate in the air and are received by an antenna comprised in the apparatus ARX or connected to the apparatus ARX.

The apparatus ARX comprises a tuner and demodulator A1 adapted to tune to electric signals according to the DVB standard, which signals are supposed to transport a first component C1 of a multimedia content MM; said electric signals are, in particular, normal television signals save for the fact, which is very important, that they have been suitably marked in accordance with the teachings of the present invention.

The apparatus ARX further comprises an interface A2 adapted to receive electric signals from the Internet, which signals are supposed to transport a second component C2 of a multimedia content MM; in the drawing, the interface A2 is connected to the Internet IP through a bidirectional arrow because the Internet works in a manner such that it requires two-way data transmission even when, at application level, contents must be transferred in one direction only.

The tuner and demodulator A1 and the interface A2 are connected to a block A3, whose task is to detect and decode the signaling marking and then control the tuner and demodulator A1 or the interface A2 accordingly. For example, the tuner and demodulator A1 receives a television signal; the block A3 detects a signaling marking on the television signal, decodes it, and determines that the left view corresponding to the right view contained in this television signal can be obtained from a server at a given Internet address and according to certain parameters; the block A3 supplies this Internet address and these parameters to the interface A2; the interface A2 connects to this server and reception of the left view begins.

The signals corresponding to the first component are sent by the tuner and demodulator A1 to a block A4; the signals corresponding to the second component are sent by the interface A2 to the block A4.

The function of the block A4 is to detect the synchronization marks on these two signals and decode them; the block A4 then hands over these two signals, along with the extracted synchronization information, to a block A5.

The function of the block A5 is to re-synchronize these two signals on the basis of the synchronization information extracted by the previous block; the block A5 then hands over these two re-synchronized signals to a block A6.

The function of the block A6 is to combine these two re-synchronized signals, i.e. the two components of the multimedia content, to form the multimedia content MM, ready for being shown to the user.

The invention claimed is:

1. A method for transmitting a multimedia content, said multimedia content comprising first and second video components, wherein said first video component comprises right views of a stereoscopic content and said second video component comprises corresponding left views of said stereoscopic content, wherein the transmission of said first video component takes place over a first transmission medium, and wherein the transmission of said second video component takes place over a second transmission medium, said method comprising:
    A) repeatedly marking, through a first predetermined "watermark" sequence, said first video component before said first video component is transmitted, and
    B) repeatedly marking, through a second predetermined "watermark" sequence, said second video component before said second video component is transmitted;
    wherein said first "watermark" sequence has a correspondence with said second "watermark" sequence,
    wherein said steps A and B are carried out in a manner such that the insertion of "watermarks" into said first video component and the insertion of "watermarks" into said second video component take place at corresponding points or instants of said first and second video components.

2. A transmission method according to claim 1, wherein said first and second video components are synchronized with each other, and said steps A and B are carried out in a manner such that said first and second video components can be re-synchronized in reception.

3. A transmission method according to claim 1, wherein said steps A and/or B are so carried out as to signal said second and/or first transmission media, respectively.

4. A transmission method according to claim 1, further comprising the step of:
    C) repeatedly marking, through a third predetermined "watermark" sequence, said first video component before said first video component is transmitted;
    wherein the "watermarks" of said third "watermark" sequence signal at least said second transmission medium.

5. A transmission method according to claim 1, further comprising the step of:
    D) repeatedly marking, through a fourth predetermined "watermark" sequence, said second video component before said second video component is transmitted;
    wherein the "watermarks" of said fourth "watermark" sequence signal at least said first transmission medium.

6. A transmission method according to claim 1, wherein the "watermarks" of said first and/or second predetermined "watermark" sequences are of the fragile or semi-fragile type.

7. A transmission method according to claim 1, further comprising:
    C) repeatedly marking, through a third predetermined "watermark" sequence, said first video component before said first video component is transmitted, wherein the "watermarks" of said third "watermark" sequence signal at least said second transmission medium; and
    D) repeatedly marking, through a fourth predetermined "watermark" sequence, said second video component before said second video component is transmitted, wherein the "watermarks" of said fourth "watermark" sequence signal at least said first transmission medium,
    wherein the "watermarks" of said first and/or second and/or third and/or fourth predetermined "watermark" sequences are of an invisible type.

8. A transmission method according to claim 1, further comprising:
    C) repeatedly marking, through a third predetermined "watermark" sequence, said first video component before said first video component is transmitted, wherein the "watermarks" of said third "watermark" sequence signal at least said second transmission medium; and
    D) repeatedly marking, through a fourth predetermined "watermark" sequence, said second video component before said second video component is transmitted, wherein the "watermarks" of said fourth "watermark" sequence signal at least said first transmission medium,
    wherein the "watermarks" of said first and/or second and/or third and/or fourth predetermined "watermark" sequences are of a multi-bit type.

9. A transmission method according to claim 8, wherein the "watermarks" of said first and/or second and/or third and/or fourth predetermined "watermark" sequences comprise one or more of the following:
    an information field adapted to signal a type of a multimedia content video component,
    an information field adapted to signal a transmission medium of a multimedia content video component,
    an information field adapted to signal a priority of a multimedia content video component,
    an information field adapted to signal a parameter of a multimedia content video component.

10. An apparatus for transmitting a multimedia content comprising first and a second video components, wherein said first video component comprises right views of a stereoscopic content and said second video component comprises corresponding left views of a stereoscopic content, said apparatus comprising:
    means for subdividing said multimedia content into said first and second video components,
    means for transmitting said first video component over a first transmission medium,
    means for transmitting said second video component over a second transmission medium, and
    means for processing said first and second video components in accordance with the transmission method according to claim 1.

11. A method for receiving a multimedia content, said multimedia content comprising first and second video components, wherein said first video component comprises right views of a stereoscopic content and said second video component comprises corresponding left views of said stereoscopic content, wherein reception of said first video component takes place over a first transmission medium, and wherein reception of said second video component takes place over a second transmission medium, said method comprising:
    A) detecting a first "watermark" sequence from said first video component,
    B) detecting a second "watermark" sequence from said second video component, C) synchronizing said first and second video components on the basis of said first and second "watermark" sequences, and D) combining said synchronized first and second video components to form said multimedia content.

12. A reception method according to claim 11, further comprising the step of:

E) determining said second transmission medium on the basis of said first "watermark" sequence;

wherein said step E is carried out prior to said steps B, C and D.

13. A reception method according to claim 11, further comprising the steps of:

F) detecting a third "watermark" sequence from said first video component,

G) determining said second transmission medium on the basis of said third "watermark" sequence;

wherein said steps F and G are carried out prior to said steps B, C and D, and also prior to said step A.

14. A reception method according to claim 12, further comprising the step of:

H) processing said first or second or third "watermark" sequence to extract one or more of the following:

an information field adapted to signal a type of a multimedia content video component, an information field adapted to signal a transmission medium of a multimedia content video component, an information field adapted to signal a priority of a multimedia content video component, an information field adapted to signal a parameter of a multimedia content video component.

15. An apparatus for receiving a multimedia content comprising first and second video components, wherein said first video component comprises right views of a stereoscopic content and said second video component comprises corresponding left views of said stereoscopic content, said apparatus comprising:

means for receiving said first video component over a first transmission medium, means for receiving said second video component over a second transmission medium, means for combining said first and second video components to form said multimedia content;

means for processing said first and second video components in accordance with the reception method according to claim 11.

* * * * *